United States Patent
Guichard et al.

(10) Patent No.: US 8,713,669 B2
(45) Date of Patent: Apr. 29, 2014

(54) MULTI-DOMAIN DYNAMIC GROUP VIRTUAL PRIVATE NETWORKS

(75) Inventors: James Neil Guichard, New Boston, NH (US); Warren Scott Wainner, Potomac Falls, VA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 778 days.

(21) Appl. No.: 11/681,277

(22) Filed: Mar. 2, 2007

(65) Prior Publication Data
US 2008/0215880 A1 Sep. 4, 2008

(51) Int. Cl.
*H04L 9/08* (2006.01)
*H04L 29/06* (2006.01)
*H04L 12/46* (2006.01)

(52) U.S. Cl.
CPC ......... *H04L 63/0272* (2013.01); *H04L 12/4641* (2013.01); *H04L 63/065* (2013.01)
USPC .......... 726/15; 726/2; 726/3; 726/11; 726/14; 380/277; 380/278; 713/162

(58) Field of Classification Search
CPC .............. H04L 12/4641; H04L 63/065; H04L 63/0272
USPC ........... 713/162; 380/277; 726/15, 13, 1, 3, 2, 726/11, 14
See application file for complete search history.

(56) References Cited

U.S. PATENT DOCUMENTS

| | | | | |
|---|---|---|---|---|
| 5,995,945 | A * | 11/1999 | Notani et al. | 705/28 |
| 6,332,130 | B1 * | 12/2001 | Notani et al. | 705/28 |
| 7,136,374 | B1 * | 11/2006 | Kompella | 370/352 |
| 7,388,844 | B1 * | 6/2008 | Brown et al. | 370/252 |
| 7,533,410 | B1 * | 5/2009 | Fung et al. | 726/15 |
| 7,590,843 | B1 * | 9/2009 | Khalil et al. | 713/171 |
| 7,680,952 | B1 * | 3/2010 | Pan et al. | 709/239 |
| 7,779,461 | B1 * | 8/2010 | Liu et al. | 726/15 |
| 7,804,826 | B1 * | 9/2010 | Khalil et al. | 370/389 |
| 7,856,509 | B1 * | 12/2010 | Kodeboyina | 709/238 |
| 2001/0027484 | A1 * | 10/2001 | Nishi | 709/223 |

(Continued)

OTHER PUBLICATIONS

Rodeh Ohad, Birman Ken, Hayden Mark, Dolev Danny. "Dynamic Virtual Private Networks." Cornell University, Ithaca, NY. (1997). 1-20 (provided by Applicant in IDS).*

(Continued)

*Primary Examiner* — Alexander Lagor
(74) *Attorney, Agent, or Firm* — Schwegman Lundberg & Woessner, P.A.

(57) ABSTRACT

Systems and/or methods of secure communication of information between multi-domain virtual private networks (VPNs) are presented. A dynamic group VPN (DGVPN) can reside in one domain and a disparate DGVPN can reside in a disparate domain. An administrative security authority (ASA) can be employed in each domain. Each ASA can generate and exchange respective keying material and crypto-policy information to be used for inter-domain communications when routing data from a member in one DGVPN to a member(s) in the disparate DGVPN, such that an ASA in one domain can facilitate encryption of data in accordance with the policy of the other domain before the data is sent to the other domain. Each ASA can establish a key server to generate the keying material and crypto-policy information associated with its local DGVPN, and such material and information can be propagated to intra-domain members.

18 Claims, 7 Drawing Sheets

(56) References Cited

U.S. PATENT DOCUMENTS

| | | | |
|---|---|---|---|
| 2002/0118671 A1* | 8/2002 | Staples et al. | 370/352 |
| 2003/0093666 A1* | 5/2003 | Millen et al. | 713/157 |
| 2003/0161297 A1* | 8/2003 | Noda et al. | 370/352 |
| 2004/0091117 A1* | 5/2004 | Narayanan | 380/277 |
| 2004/0255147 A1* | 12/2004 | Peled et al. | 713/200 |
| 2006/0005185 A1* | 1/2006 | Nguyen | 718/1 |
| 2006/0018300 A1* | 1/2006 | Westberg et al. | 370/351 |
| 2006/0184999 A1 | 8/2006 | Guichard et al. | |
| 2006/0198368 A1 | 9/2006 | Guichard et al. | |
| 2007/0157025 A1* | 7/2007 | Sastry et al. | 713/170 |
| 2007/0192543 A1* | 8/2007 | Naik et al. | 711/133 |
| 2007/0248225 A1* | 10/2007 | Fluhrer | 380/30 |
| 2008/0046571 A1* | 2/2008 | Tuononen et al. | 709/227 |
| 2008/0118070 A1* | 5/2008 | Yeap et al. | 380/282 |
| 2008/0127327 A1* | 5/2008 | Carrasco | 726/15 |
| 2008/0133729 A1* | 6/2008 | Fridman et al. | 709/223 |
| 2008/0298342 A1* | 12/2008 | Appleton et al. | 370/351 |

OTHER PUBLICATIONS

MPLS Virtual Private Networks. Cisco IOS Release 12.0(5)T. Dec. 1999. 1-50 (provided by Applicant in IDS).*

Isaacs, Rebecca. "Lightweight, dynamic and programmable virtual private networks." Mar. 2000. IEEE Third Conference on Open Architectures and Network Programming (OpenArch). 3-12.

Rodeh, Ohad, Birman, Ken, Hayden, Mark. "Dynamic Virtual Private Networks." Cornell University, Ithaca, NY. (1997). 1-20.

MPLS Virtual Private Networks. Cisco IOS Release 12.0(5)T. Dec. 1999. 1-50.

* cited by examiner

MULTI-DOMAIN DYNAMIC GROUP VIRTUAL PRIVATE NETWORKS

BACKGROUND

Dynamic Group Virtual Private Networks (DGVPNS) provide a highly scalable method for Customer Edge-to-Customer Edge (CE-CE) encryption across a Virtual Private Network (VPN) environment where all of the devices are confined to a single Internet Protocol (IP) routing domain under a single management/security authority. For example, typically, a DGVPN can be deployed in a Multi-Protocol Label Switching (MPLS) VPN network where the VPN is limited to a single service provider network.

In a multi-domain network where DGVPNs are utilized and devices are deployed that involve multiple providers, each set of devices must be segregated into provider-specific DGVPN groups. However, in such an instance, inter-domain security is an issue to be addressed. A conventional approach for providing security between disparate domains can involve bridging the two domains with a pair-wise encrypted link or tunnel. For example, when an Autonomous System Border Router (ASBR) associated with domain a (ASBRa) needs to route a packet to an ASBR associated with domain b (ASBRb) (e.g., routed from Provider Edge a (PEa) to Provider Edge b (PEb)), ASBRa decrypts the packet using keys that are a part of DGVPNa and re-encrypts the packet under pair-wise keys shared with ASBRb. Correspondingly, ASBRb decrypts the packet and re-encrypts it using DGVPNb keys before forwarding it.

This inter-domain bridging method can create certain problems. For example, the ASBRs are forced to do two sets of crypto operations on every packet flowing through them. Further, the domain owning the prefixes (e.g., receiving packets) has no visibility with regard to the protection provided to the packets in the other domain, or indeed whether the packets were protected in the other domain at all. Moreover, in some cases, the two DGVPN groups are not the same enterprise, but the bridge exists to share packets between a subset of customer prefixes. However, there is no protection available to either DGVPN when unauthorized data packets are accidentally sent across the inter-domain link.

Service/content providers desire the ability to provide intra-domain security for VPNs that are bounded by their domain and inter-domain security for VPNs that extend beyond the boundaries of their domain.

OVERVIEW

The following presents a simplified overview of the specification in order to provide a basic understanding of some aspects of the technology. This overview is not an extensive overview of the subject disclosure. It is not intended to identify key/critical elements of the subject disclosure or to delineate the scope of the technology. Its sole purpose is to present some concepts of the technology in a simplified form as a prelude to the more detailed description that is presented later.

The technology disclosed herein, in one embodiment thereof, comprises an administrative security authority (ASA) that can reside in each domain of a multi-domain network comprising Dynamic Group Virtual Private Networks (DGVPNs), wherein the ASAs can exchange keying material and crypto-policy information to be used when routing data packets to prefixes in their respective autonomous system (AS). Each domain can be associated with a service provider that is a cooperating provider with the service provider of the other domain. The ASA can include a key server component that can generate keying material and crypto-policy information as well as a cryptographic component that can facilitate encryption and decryption of data, and thereby facilitate secure intra-domain communications. Further, the ASA can obtain keying materials and crypto-policy information associated with another domain(s) and propagate such materials and information to components within its network (e.g., DGVPN) to facilitate inter-domain communications between its domain and another domain, and a device(s) or member associated with the other domain. The propagation of crypto-policy and keying material by the ASA builds a trust chain with the ASA of the other domain that mitigates the requirement of either ASA having explicit knowledge of every device in the multi-domain environment.

In another embodiment of the disclosed subject matter, a respective policy exchanged between ASAs of respective domains can include a list of prefixes to which the respective policy can be applied. In yet another embodiment, the prefixes may be marked or tagged during router distribution. For example, the prefixes may be marked as part of a DGVPN environment (e.g. associated with a first domain) and propagated by the routing protocol used between border routers associated with the respective domains.

In still another embodiment, with regard to VPN routing/forwarding instances (VRFs), a VRF-global-interface outbound crypto-map mapping can be employed such that a crypto-policy may be applied to data packets outside of the local domain (e.g., data packets destined to Domain b from Domain a). Such mapping can be used so that packets that desire encryption entering a VRF interface are able to use the relevant policy for that VPN based on the crypto-map associated with that VRF. In contrast, conventionally, there would be a single crypto-map on an outbound interface associated with a single VRF.

To the accomplishment of the foregoing and related ends, certain illustrative aspects are described herein in connection with the following description and the annexed drawings. These aspects are indicative, however, of but a few of the various ways in which the principles of the technology can be employed and the subject specification is intended to include all such aspects and their equivalents. Other advantages and features of the technology will become apparent from the following detailed description when considered in conjunction with the drawings.

DESCRIPTION OF EXAMPLE EMBODIMENTS

Figure 1:
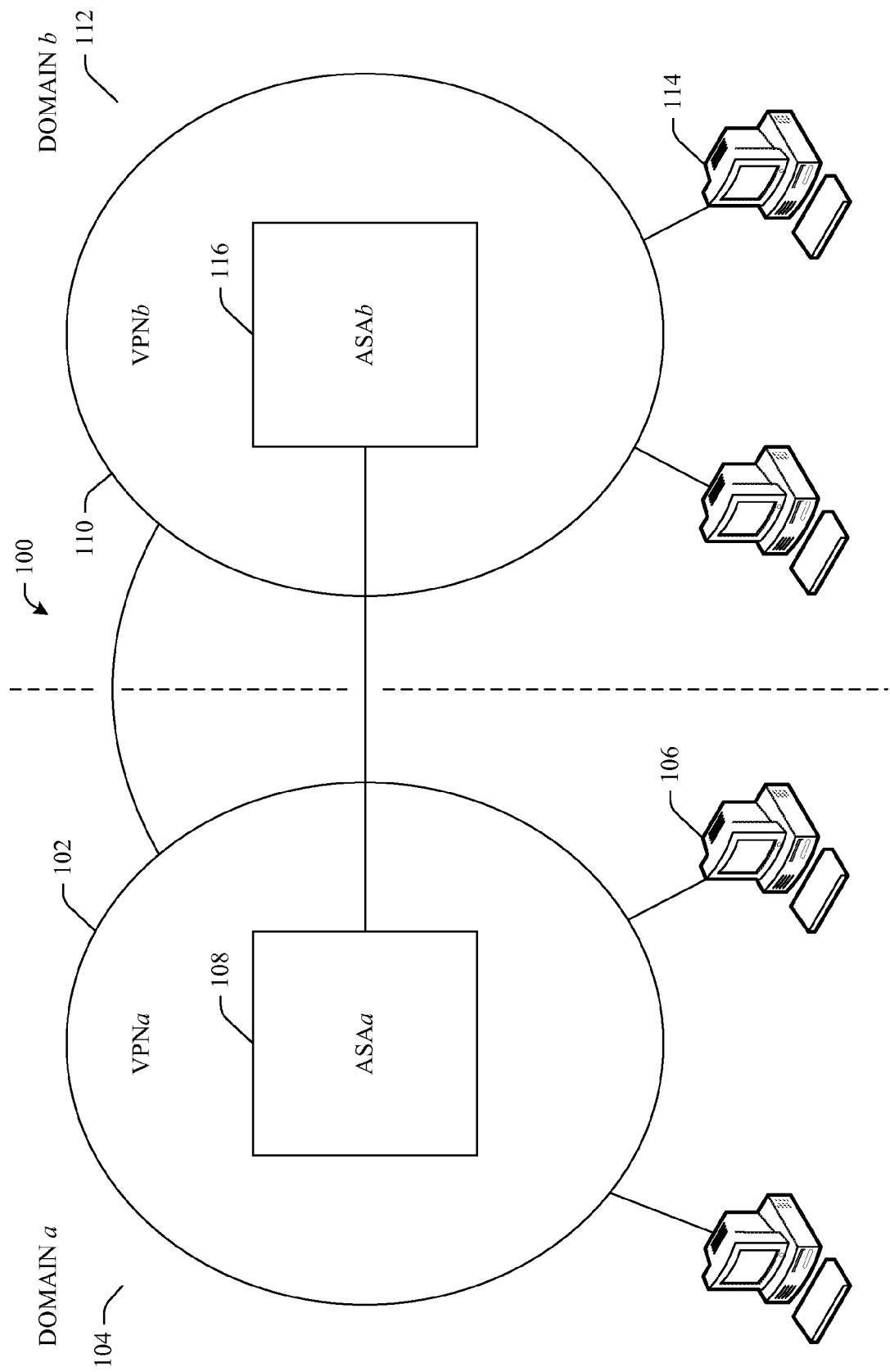
FIG. 1 illustrates an example system that facilitates secure data communication in accordance with an embodiment.

The technology is now described with reference to the drawings, wherein like reference numerals are used to refer to like elements throughout. In the following description, for purposes of explanation, numerous specific details are set forth in order to provide a thorough understanding of the features and functionality. It may be evident, however, that the technology can be practiced without these specific details. In other instances, well-known structures and devices are shown in block diagram form in order to facilitate describing the features and functionality.

Service/content providers desire the ability to provide intra-domain security for Virtual Private Networks (VPNs) that are bounded by their domain and inter-domain security for VPNs that extend beyond their domain. Dynamic Group VPNs (DGVPNs) can provide a highly scalable system/method for Customer Edge-to-Customer Edge (CE-CE) encryption across a VPN environment. DGVPN can typically be deployed in a Multi-Protocol Label Switching (MPLS) VPN network. However, conventionally, DGVPNs have been limited to a single service provider network.

An Administrative Security Authority (ASA) is disclosed that can be located in each domain and can exchange keying material and crypto-policy information to be used when routing packets to prefixes in the respective autonomous systems. The ASA can include a key server to generate keying material and policy for not only its local network (e.g., DGVPN) for intra-domain communications, but also for inter-domain communications, where such material and information can be sent to another ASA in another domain, so that data, which is being sent from a disparate network (e.g., disparate DGVPN) in the other domain to a network in the first domain, can be encrypted according to the policy of the first ASA. The encrypted data can be sent from the other domain to the first domain, where keys and crypto-policy distributed by the first ASA can facilitate the decryption of the data, and the decrypted data can be presented to a group member associated with the DGVPN of the first domain, for example.

Referring to the drawings, FIG. 1 illustrates an example system 100 that facilitates secure data communication in accordance with an embodiment. More particularly, in accordance with an example embodiment, the system 100 can include VPNa 102, which can be a VPN associated with Domain a 104 and can further be associated with a first service/content provider. In one embodiment, VPNa 102 can be a DGVPN, although the subject disclosure is not so limited, and VPNa 102 can be any VPN that facilitates data communication.

VPNa 102 can be associated with a plurality of devices 106 (e.g., computer, Personal Digital Assistant (PDA), cellular phone, etc.), where each can be a group member of VPNa 102, for example. Each of the plurality of devices 106 can send data to and/or receive data from another of the plurality of devices 106 (e.g., group members) associated with Domain a 104 and/or other devices outside of Domain a 104. VPNa 102 can further include ASAa 108 that can facilitate intra-domain secure communication of data between devices, such as the plurality of devices 106, associated with Domain a 104. In one embodiment, ASAa 108 can be a key server. In another embodiment, ASAa 108 can include and/or be associated with a key server (not shown). For example, ASAa 108 can facilitate the authentication of devices 106, as well as generation, maintenance, and distribution of key materials and crypto-policy information, associated with the service/content provider of Domain a 104, to facilitate the encryption and decryption of data communicated between the devices 106. Further, ASAa 108 can facilitate inter-domain secure communication of data between devices, as described herein.

System 100 can further include VPNb 110, which can be a VPN associated with Domain b 112 and can further be associated with a disparate service/content provider. In one embodiment, VPNb 110 can be a DGVPN, although the subject disclosure is not so limited, and VPNb 110 can be any VPN that facilitates data communication. VPNb 110 can be associated with a plurality of devices 114 (e.g., computer, PDA, cellular phone, etc.), where each can be a group member of VPNb 110, for example. Each of the plurality of devices 114 can send data to and/or receive data from another of the plurality of devices 114 associated with Domain b 112 and/or other devices outside of Domain b 112, such as devices 106 of Domain a 104. VPNb 110 can further include ASAb 116 that can facilitate intra-domain secure communication of data between devices, such as the plurality of devices 114, associated with Domain b 112. In one embodiment, ASAb 116 can be a key server. In another embodiment, ASAb 116 can include and/or be associated with a key server (not shown). For example, ASAb 116 can facilitate the authentication of devices 114, as well as generation, maintenance, and distribution of key materials and crypto-policy information, associated with the service/content provider of Domain b 112, to facilitate the encryption and decryption of data communicated between the devices 114. Further, ASAb 116 can facilitate inter-domain secure communication of data between devices, as described herein.

To facilitate inter-domain secure communications, the service/content provider of Domain a 104 and the service/content provider of Domain b 112 can cooperate with each other such that each provider can delegate certain security functions (e.g., policy and key distribution) to the ASA of the other domain for the ASA to implement in accordance with the security policy of the other domain. It is to be appreciated that, while system 100 is shown with two cooperating service/content providers, the subject disclosure is not so limited and can include any number of cooperating service/content providers.

For example, if a device 106 in Domain a 104 desires to send data to a device 114 in Domain b 112, and such data is to be encrypted for security, ASAa 108 can contact ASAb 116 to request keying materials and crypto-policy information associated with VPNb 110. ASAb 116 can require that ASAa 108 authenticate by providing credentials to determine whether the service/content provider associated with ASAa 108 is a cooperating provider. A secure channel can then be established between ASAa 108 and ASAb 116 to facilitate the secure transfer of such materials and information. Since the service/content providers of the domains 104, 112 are cooperating, ASAb 116 can then send the keying materials, or a subset thereof, and crypto-policy information, or a subset thereof, associated with VPNb 110 to ASAa 108 thereby delegating to ASAa 108 the authority and ability to secure (e.g., encrypt) the data according to the policy associated with VPNb 110. ASAa 108 can then facilitate the distribution of policy and key material to members of VPNa 102, where the keying materials and crypto-policy information are associated with VPNb 110 in Domain b 112, such that a consistent encryption and decryption policy exists between the group members of VPNa 102 and VPNb 110. The encrypted data can then be transmitted from VPNa 102 to VPNb 110, where the data can be decrypted according to the policy associated with VPNb 110, and communicated to the device 114 in Domain b 112. Thus, there is no need for ASAb 116 to authenticate and authorize the group members (e.g., 106) of VPNa 102, as ASAb 116 has delegated this authority to ASAa 108.

Similarly, when sending data securely from a group member 114 in VPNb 110 associated with Domain b 112 to a group member 106 in VPNa 102 associated with Domain a 104, ASAb 116 can contact ASAa 108 to obtain the keying materials and crypto-policy information associated with VPNa 102 and ASAa 108 can send such materials and information to ASAb 116 via a secure channel established between the components. ASAb 116 can encrypt the crypto-policy and keys in accordance with the policy of ASAa 108 and the encrypted policy and keys can be sent to Domain a 104, as ASAa 108 has delegated such authority to ASAb 116. When the encrypted data is transmitted to Domain a 104 into VPNa 102, the encrypted data can be decrypted according to the policy associated with VPNa 102 and provided to the group member 106.

Figure 2:
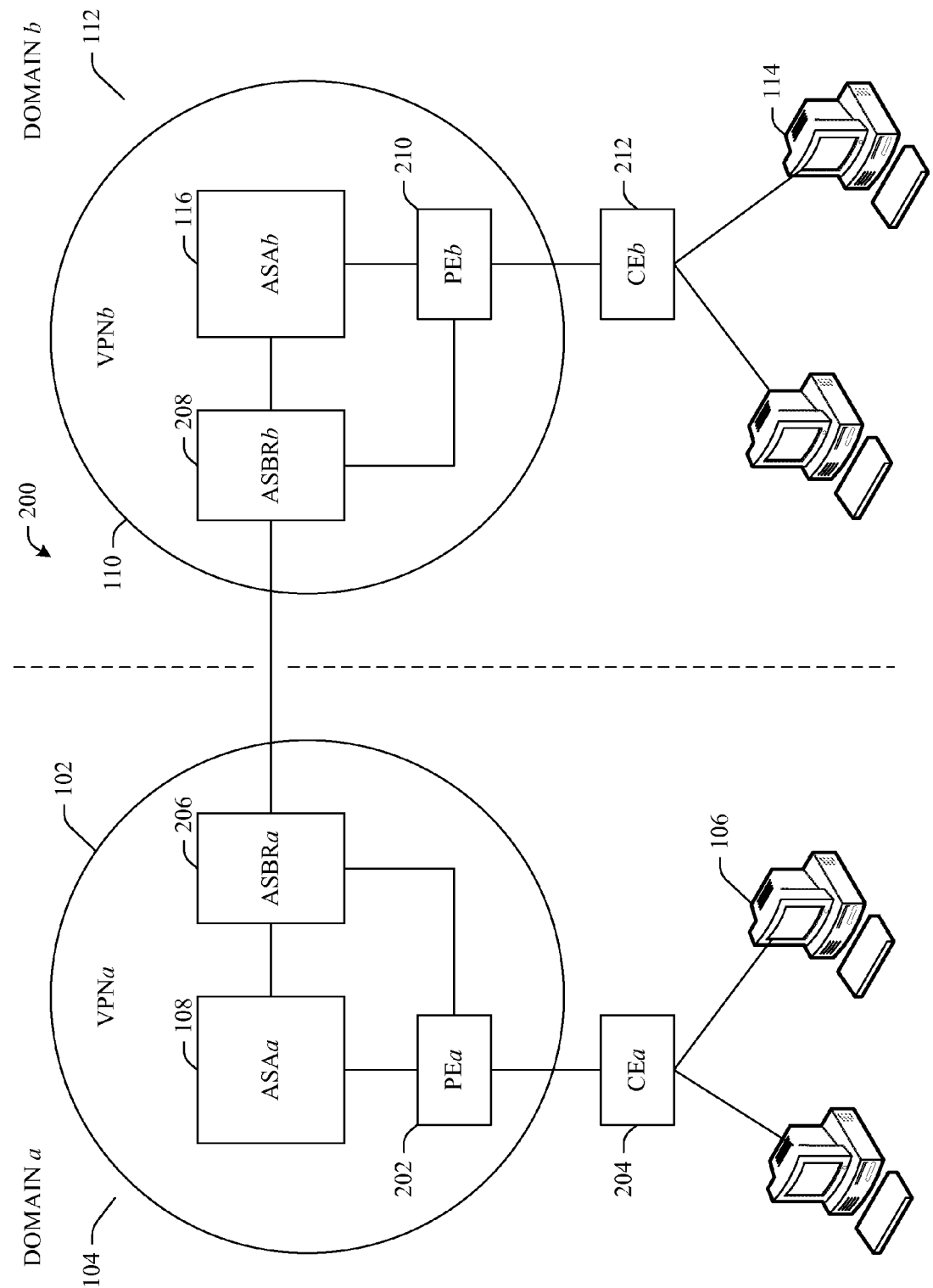
FIG. 2 illustrates another example system that facilitates secure data communication in accordance with an embodiment.

Turning now to FIG. 2, an illustration of an example system 200 that facilitates secure data communication in accordance with an embodiment is presented. According to the embodiment, system 200 can include VPNa 102, which can be a VPN associated with Domain a 104 and can further be associated with a first service/content provider. VPNa 102 can include PEa 202, which can be a Provider Edge (PE) router, for example. PEa 202 can be associated with CEa 204, which can be a Customer Edge (CE) router, for example. CEa 204 can be associated with a plurality of devices 106 (e.g., computer, PDA, cellular phone, etc.), where each can be a group member of VPNa 102, for example. Each of the plurality of devices 106 can send data to and/or receive data from another of the plurality of devices 106 (e.g., group members) associated with Domain a 104 and/or other devices outside of Domain a 104. VPNa 102 can further include ASAa 108 that can be associated with PEa 202 and can facilitate intra-domain secure communication of data between devices, such as the plurality of devices 106, associated with Domain a 104. In one embodiment, ASAa 108 can be a key server. In another embodiment, ASAa 108 can include and/or be associated with a key server (not shown). For example, ASAa 108 can facilitate the authentication of devices 106, as well as generation, maintenance, and distribution of key materials and crypto-policy information, associated with the service/content provider of Domain a 104, to facilitate the encryption and decryption of data communicated between the devices 106. Further, ASAa 108 can facilitate inter-domain secure communication of data between devices, as described herein.

ASAa 108 can further be associated with ASBRa 206, which can be an Autonomous System Border Router (ASBR), for example, that can facilitate the transfer of data from Domain a 104 to Domain b 112 as well as the receipt of data from Domain b 112. The data can include keying materials and crypto-policy information associated with ASAa 108 and/or ASAb 116. Further, ASBRa 206 can be associated with PEa 202 and can facilitate the transfer of data from a device 106 in Domain a 104 to Domain b 112 and a device(s) associated therewith.

ASBRa 206 can further be associated with ASBRb 208 (e.g., ASBR) to facilitate communication of data packets between VPNa 102 in Domain a 104 and VPNb 110, which can be associated with Domain b 112 and can further be associated with a disparate service/content provider. VPNb 110 can include ASAb 116 that can facilitate intra-domain secure communication of data between devices, such as a plurality of devices 114 (e.g., computer, PDA, cellular phone, etc.), associated with Domain b 112. In one embodiment, ASAb 116 can be a key server. In another embodiment, ASAb 116 can include and/or be associated with a key server (not shown). For example, ASAb 116 can facilitate the authentication of devices 114, as well as generation, maintenance, and distribution of key materials and crypto-policy information, associated with the service/content provider of Domain b 112, to facilitate the encryption and decryption of data communicated between the devices 114. Further, ASAb 116 can facilitate inter-domain secure communication of data between devices, as described herein.

ASAb 116 can also be associated with ASBRb 208 that can facilitate the transfer of data from Domain b 112 to Domain a 104 as well as the receipt of data from Domain a 104. The data can include keying materials and crypto-policy information associated with ASAa 108 and/or ASAb 116, for example.

VPNb 110 can further include PEb 210 (e.g., PE router) that can be associated with ASBRb 208 to facilitate the transfer of data from the devices 114 to VPNa 102, and likewise, to facilitate the transfer of data received from VPNa 102 to CEb 212 (e.g., CE router) and ultimately to one or more of the plurality of devices 114. PEb 210 can also be associated with ASAb 116 and can receive keying materials and crypto-policy information to facilitate the employment of security functions (e.g., encryption, decryption) to secure data packets being routed through VPNb 110 from or to the devices 114. Each of the devices 114 can send data to and/or receive data from another of the plurality of devices 114 associated with Domain b 112 and/or other devices outside of Domain b 112, such as the devices 106 of Domain a 104.

To facilitate inter-domain secure communications, cooperating service/content providers associated with the domains 104 and 112 can cooperate with each other such that each provider can delegate certain security functions (e.g., policy creation, key distribution) to the ASA (e.g., 108, 116) of the other domain for the ASA to implement in accordance with the security policies of the other domain. It is to be appreciated that, while system 200 is shown with two cooperating service/content providers, the subject disclosure is not so limited and can include any number of cooperating service/content providers.

For example, if a device 106 in Domain a 104 desires to send data to a device 114 in Domain b 112, and such data is to be encrypted for security, ASAa 108 can contact ASAb 116 to request keying materials and crypto-policy information associated with VPNb 110. ASAb 116 can require that ASAa 108 authenticate by providing credentials to determine whether the service/content provider associated with ASAa 108 is a cooperating provider. A secure channel can then be established between ASAa 108 and ASAb 116 to facilitate the secure transfer of such materials and information. Since the service/content providers of the domains 104, 112 are cooperating, ASAb 116 can then send the keying materials, or a subset thereof, and crypto-policy information, or a subset thereof, associated with VPNb 110 to ASAa 108 thereby delegating to ASAa 108 the authority and ability to distribute the crypto-policy and keys according to the policy associated with VPNb 110. ASAa 108 can then facilitate the encryption of the data sent by the group member 106 of VPNa 102 by propagating, to the group member 106, the keying materials and crypto-policy information associated with VPNb 110 in Domain b 112. The encrypted data can then be transmitted to VPNb 110, where the data can be decrypted according to the policy associated with VPNb 110, and communicated to the device 114 in Domain b 112. Thus, there is no need for ASAb 116 to authenticate and authorize the group members (e.g., 106) of VPNa 102, as ASAb 116 has delegated this authority to ASAa 108.

As further example, a group member 106 (e.g., computer) in Domain a 104 may initiate sending data to Domain b 112, and/or a group member 114 (e.g., computer, PDA) associated therewith. Prior to sending the data to Domain b 112, a determination can be made as to what type of security (e.g., encryption), if any, should be provided to such data. The ASAa 108 can establish a secure channel of communication with ASAb 116, and ASAa 108 can request keying material and crypto-policy information from ASAb 116. ASAb 116 can then encrypt and send the keying material, or a subset thereof, and crypto-policy information, or a subset thereof, to ASAa 108. ASAa 108 can decrypt the keying material and crypto-policy, and propagate such keying material and crypto-policy information to a PEa 202 in Domain a 104. The data can be forwarded from the group member to CEa 204, and, upon being forwarded to PEa 202, PEa 202 can use the keying material and crypto-policy information to encrypt the data in accordance with the keying material and crypto-policy information associated with Domain b 104. In accordance with another embodiment of the disclosed subject matter, the keying material and crypto-policy can be propagated to CEa 204, where CEa 204 can use such keying material and crypto-policy to encrypt the data in accordance with the keying material and crypto-policy information associated with Domain b 104. The encrypted data can then be forwarded to PEa 202.

PEa 202 can send the encrypted data via VPNa 102 (e.g., DGVPN) to ASBRa 206. ASBRa 206 can then transmit the encrypted data to ASBRb 208 in Domain b 112. The encrypted data can then be routed via the VPNb 110 (e.g., DGVPN) to PEb 210. PEb 210 can then request keying materials and crypto-policy information from ASAb 116. After receiving same, PEb 210 can decrypt the encrypted data in accordance with the policies of VPNb 110. PEb 210 can then forward the decrypted data to CEb 212, where the decrypted data can be transmitted to the desired group member in its Domain b 112. In accordance with another embodiment of the disclosed subject matter, instead of PEb 210 decrypting the data, PEb 210 can forward the encrypted data to CEb 212. The keying materials and crypto-policy also can be propagated from ASAb 116 to CEb 212 via PEb 210. CEb 212 can then decrypt the encrypted data in accordance with the policies of VPNb 110. The decrypted data can be forwarded to the desired group member 114 of Domain b 112.

Similarly, when sending data securely from a group member 114 in VPNb 110 associated with Domain b 112 to a group member 106 in VPNa 102 associated with Domain a 104, ASAb 116 can contact ASAa 108 to obtain the keying materials and crypto-policy information associated with VPNa 102. ASAa 108 can require ASAb 116 to authenticate by providing appropriate credentials, for example. Upon authenticating ASAb 116, ASAa 108 can encrypt and send such materials and information to ASAb 116 via a secure channel established between the components. As ASAa 108 has delegated certain authority to ASAb 116, ASAb 116 can decrypt the keying materials and crypto-policy information and distribute such materials and information to PEb 210 (or, in an alternative embodiment, to CEb 212) to encrypt the data in accordance with the policy of ASAa 108. The encrypted data then can be sent to VPNa 102 in Domain a 104. The encrypted data then can be transmitted to Domain a 104 into VPNa 102. The encrypted data can be decrypted, in accordance with the policy associated with ASAa 108, by PEa 202 (or, in an alternative embodiment, by CEa 204) using keying material and crypto-policy information provided by ASAa 108. The decrypted data then can be provided to the desired group member 106.

A respective policy exchanged between ASAa 108 and ASAb 116 may include a list of prefixes to which the respective policy should be applied, for example. In another embodiment, prefixes may be marked or tagged during router distribution. For example, the prefixes may be marked as part of the routing protocol used between ASBRa 206 and ASBRb 208 within Domain a 104 and Domain b 112. In either case, PEa 202 will be able to honor the policy described by ASAb 116 for members of VPNb 110, and likewise, PEb 210 will be able to honor the policy described by ASAa 108 for members 106 of VPNa 102. Further, with regard to multicast sources, the policy can be associated to prefixes that serve as multicast sources such that receivers in an adjacent domain may obtain the appropriate key material for inter-domain multicast trees.

System 200 can also facilitate communication of data with regard to VPN routing/forwarding instances (VRFs). In particular, system 200 can employ a VRF-global-interface outbound crypto-map mapping such that policy may be applied to data packets outside of the local domain (e.g., data packets destined to Domain b 112 from Domain a 104). Such mapping can be used so that packets that desire encryption entering a VRF interface are able to use the relevant policy for that VPN based on the crypto-map associated with that VRF.

For example, a VRF can act as a routing point that can be associated with or connected to interfaces. Traffic (e.g., data packets) can be routed into and out of the interfaces associated with the VRF. A virtual interface (I/F) can be connected in the VRF, so that from the VRF traffic can be routed into the virtual I/F and, and traffic can be received by the VRF from the virtual I/F. One property of a virtual I/F is that it can route traffic into a global table, as opposed to a private routing table. The virtual I/F can be associated with a crypto-map, which is basically a flag on a data packet flow going out of or into the virtual I/F relating to checking the packets that are ingressing or egressing the virtual I/F to ensure that the packets match the crypto-policy. If the data packets match the crypto-policy, then the crypto-policy can be executed. By creating a VRF, a virtual I/F, and applying a crypto-map on this virtual I/F, encryption/decryption trafficking is facilitated into and out of the VRF, where the resulting packet then can be routed to a global table. Since the data packet is already encrypted when it is received in the global table, there is no concern regarding private traffic being exposed in the global environment.

As the data packet moves from the virtual I/F, an order of operations can make a routing decision in the VRF, and the decision can be to route the data packet out of that particular virtual I/F, where functions associated with that I/F, which can include, for example, access list, filtering, and/or cryptography, can be performed. Upon seeing a crypto-flag, the data packet can be encrypted. As a result, the encrypted data packet is now routable in a public environment without concern for exposing the contents, and processing of the data packet in the global routing table can be continued without exposing private data.

As disclosed herein, system 200 can obviate the need for ASAa 108 to authenticate and authorize the group members (e.g., 114) of VPNb 112, and vice versa with respect to ASAb 116 and group members 106. VPNa 102 has delegated authority to ASAb 116 with regard to securing data, in accordance with the policy of VPNa 102, being sent from a member 114 associated with Domain b 112 to a member 106 associated with Domain a 104. Similarly, VPNb 110 has delegated authority to ASAa 108 with regard to securing data, in accordance with the policy of VPNb 110, being sent from a member 106 associated with Domain a 104 to a member 114 associated with Domain b 112.

Further, system 200 can facilitate reducing the number of instances of encryption and decryption of data sent between the domains 104, 112, as compared to conventional systems and/or methods. For example, conventionally, when data packets are sent from a group member 106 in Domain a 104 to a group member 114 in Domain b 112, the data packets will be encrypted according to the policy associated with VPNa 102 (and generated by ASAa 108) as the data packets are routed through VPNa 102. When the data packets reach ASBRa 206, the data packets may then be decrypted according to the policy associated with VPNa 102, and then re-encrypted under pair-wise keys shared with ASBRb 208, prior to being sent to ASBRb 208 in Domain b 112. Upon entering Domain b 112, the data packets will then be decrypted again in accordance with the pair-wise keys. The data packet will then be encrypted again, this time according to the policy associated with VPNb 110 (and generated by ASAb 116). The data packets will be routed through VPNb 110, and then decrypted again, according to the policy associated with VPNb 110, to be delivered to the group member 114. Thus, three sets of encryption/decryption are performed on each data packet to send data from group member 106 in Domain a 104 to group member 114 in Domain b.

In contrast, the subject disclosure facilitates encrypting the data packets, while the data packets reside in Domain a 104, according to the policy associated with VPNb 110, as generated by ASAb 116 and forwarded to ASAa 108 to be distributed to the domain member(s) 106 of Domain a 104. The encrypted data can then be transmitted to ASBRa 206 and forwarded, as encrypted, to ASBRb 208 of Domain b 112 and routed through VPNb 110, where it can finally be decrypted according to the policy associated with VPNb 110, as generated by ASAb 116, and delivered to group member 114. Thus, data may be sent from group member 106 in Domain a 104 to group member 114 in Domain b by performing one set of encryption/decryption on each data packet, as opposed to three sets of encryption/decryption, conventionally.

Thus, a provider can send traffic securely between autonomous systems (e.g., Domain a 104, Domain b 112) without having to deploy additional encryption mechanisms. Further, the border routers (e.g., ASBRa 206, ASBRb 208) are not required to take on an encryption burden. The subject disclosure can allow prefix owners (or multicast content sources) to choose the policy protecting their data packets, even within cooperating domains. The subject disclosure can also prevent label spoofing at the AS boundaries and therefore can allow a VPN service provider to deploy VPN services without special label check algorithms at an AS border (e.g., at ASBRa 206). Moreover, the subject disclosure can enhance the value of a service/content provider deploying DGVPN within its own network, such that the provider can sell DGVPN as a service, because the provider can partner with other providers and sell a DGVPN service to customers using the combined network.

Figure 3:
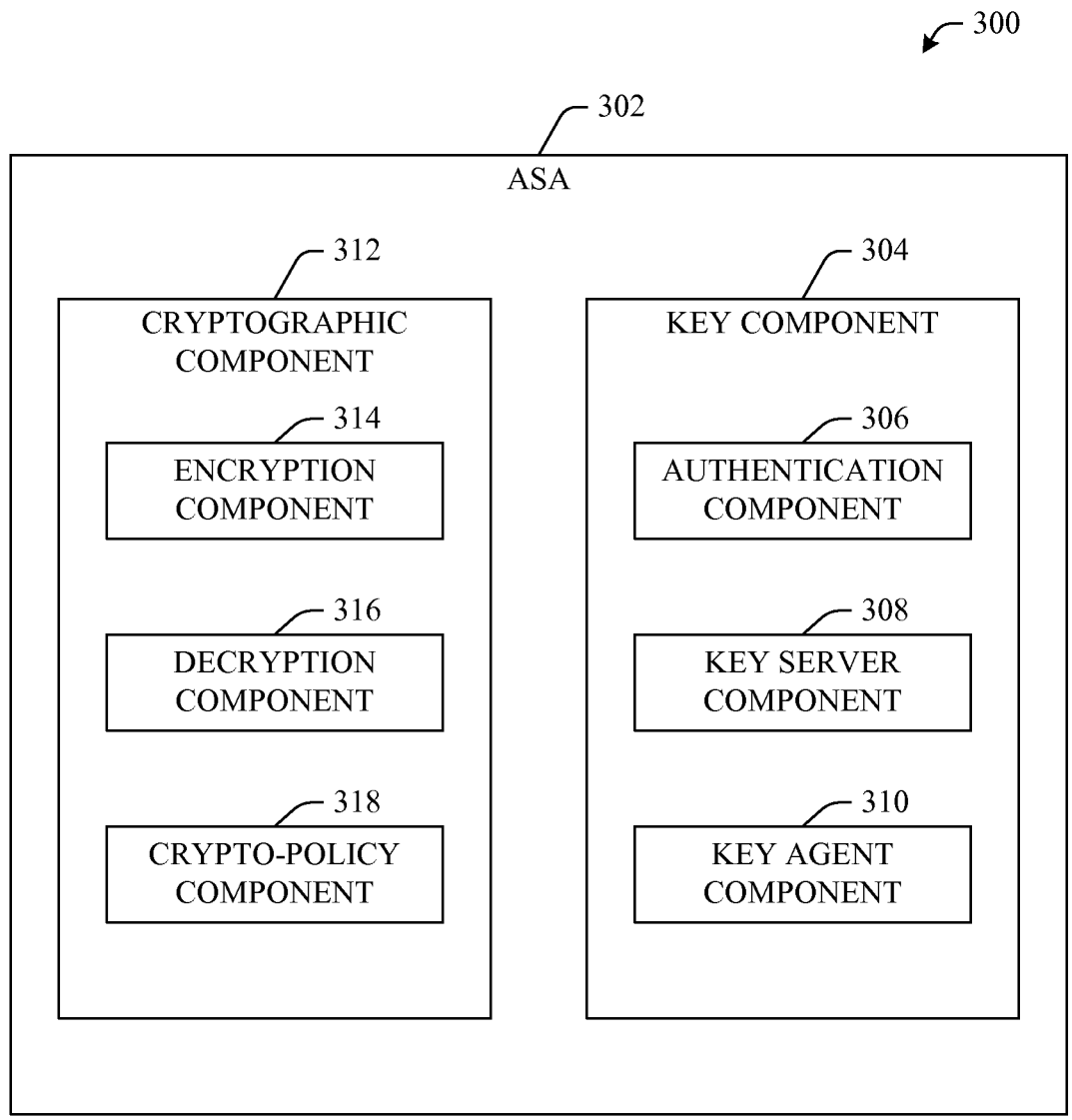
FIG. 3 illustrates an example administrative security authority in accordance with an embodiment.

With reference now to FIG. 3, an illustration of an example system 300 that facilitates secure data communication in accordance with an embodiment is presented. System 300 can include an ASA 302 that can facilitate intra-domain and inter-domain communication of data, including secured (e.g., encrypted) data. With reference again to FIG. 1 and FIG. 2, ASAa 108 and ASAb 116 are examples of ASA 302. ASA 302 can include a key management component 304 that can facilitate the generation and distribution of keying materials and crypto-policy information associated with the domain in which ASA 302 resides in order to facilitate intra-domain communication of data, for example, from a group member associated with a DGVPN to another group member within the DGVPN. The key management component 304 can also communicate with a key management component in another domain to obtain keying materials and crypto-policy information associated with the other domain to facilitate securing and sending data packets from a group member in its domain to the other domain.

The key management component 304 can include an authentication component 306 that can prevent access to keying materials and crypto-policy information if proper credentials are not presented, and can authorize access to such materials and information when proper credentials are presented. Authentication component 306 can facilitate establishing a secure channel of communication between ASA 302 and another ASA in another domain. Key management component 304 can also include a key server component 308 that can generate keying materials and crypto-policy information associated with its domain and VPN and provide such material and information to an ASA in another domain, so that data packets being transmitted from the other domain to the domain associated with key server component 308 can be encrypted in accordance with the policy of the VPN associated with the key server component 308. Key management component 304 can further include a key agent component 310 that can contact an ASA in the other domain and request and obtain keying material and crypto-policy information associated with the other domain from the other ASA. Such material and information can be used to encrypt data according to the policy associated with the network of the other domain, so that data can be securely sent from the domain in which the ASA resides to the other domain to a group member(s) associated therewith, for example.

ASA 302 can further include a cryptographic management component 312 that can be associated with the key management component 304 and can facilitate the encryption and decryption of data in accordance with the appropriate policy. Cryptographic management component 312 can include an encryption component 314 that can facilitate encrypting data (e.g., data packets). The encryption can be a type of encryption that is in accordance with the keying materials and crypto-policy information specified by the network in the domain in which the ASA 302 resides, where the communication of data is intra-domain. Further, the encryption can be performed in accordance with keying materials and crypto-policy information specified by a network associated with another domain, where the communication of data is inter-domain, for example. Encryption component 314 can employ any suitable form or type of encryption, such as Advanced Encryption Standard (AES), Data Encryption Standard (DES), Triple DES (TDES), for example, although the subject disclosure is not so limited. Cryptographic management component 312 can also include a decryption component 316 that can facilitate decrypting data. The decryption can be a type of decryption that is in accordance with the policy of the domain in which the ASA 302 resides, where the communication of data is intra-domain. Further, the decryption can be performed in accordance with a policy associated with another domain, where the communication of data is inter-domain, for example. Decryption component 316 can employ any suitable form or type of decryption, such as decryption associated with AES, DES, TDES, for example, although the subject disclosure is not so limited.

Cryptographic management component 312 can also include a crypto-policy component 318 that can determine which crypto-policy is to be implemented, if any, with regard to data being routed through the network. For example, with regard to intra-domain communications, the crypto-policy management component 318 can determine whether the particular data needs to be encrypted or decrypted, and if so, what type of encryption or decryption should be employed. With regard to inter-domain communications, the crypto-policy management component 318 can obtain and/or reference the keying materials and crypto-policy information associated with the other domain, which can be obtained by the key server component 308. The crypto-policy management component 318 can facilitate the encryption of data in accordance with such materials and information, and the encrypted data can then be sent to the other domain, for example. Further, when data encrypted in accordance with the domain of component 318 is received from another domain, the crypto-policy management component 318 can facilitate the decryption of such data in accordance with the keying materials and crypto-policy information associated with its domain.

Figure 4:
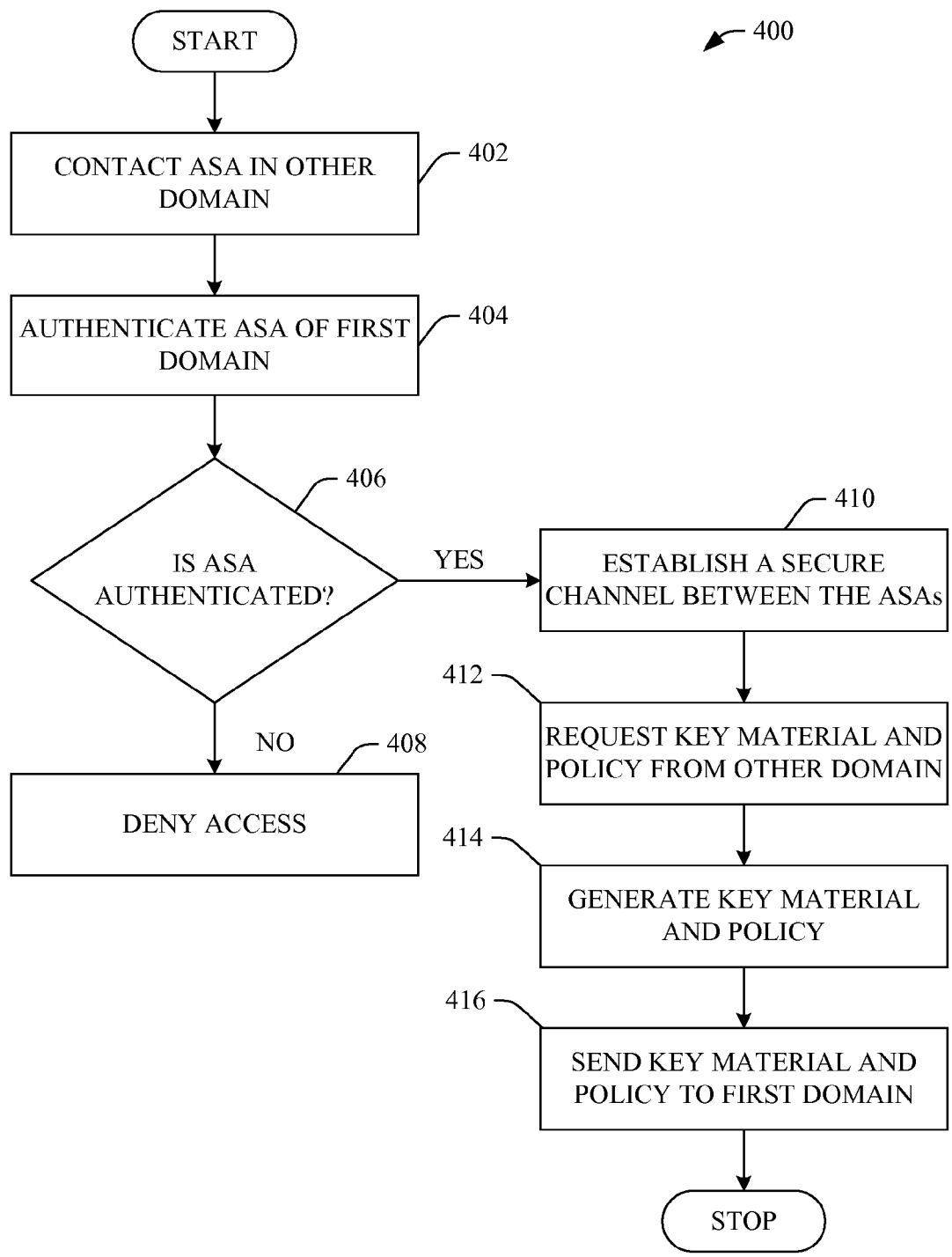
FIG. 4 illustrates a flow chart of an example methodology that facilitates establishing a secure channel of communication between domains in accordance with an embodiment.
Figure 5:
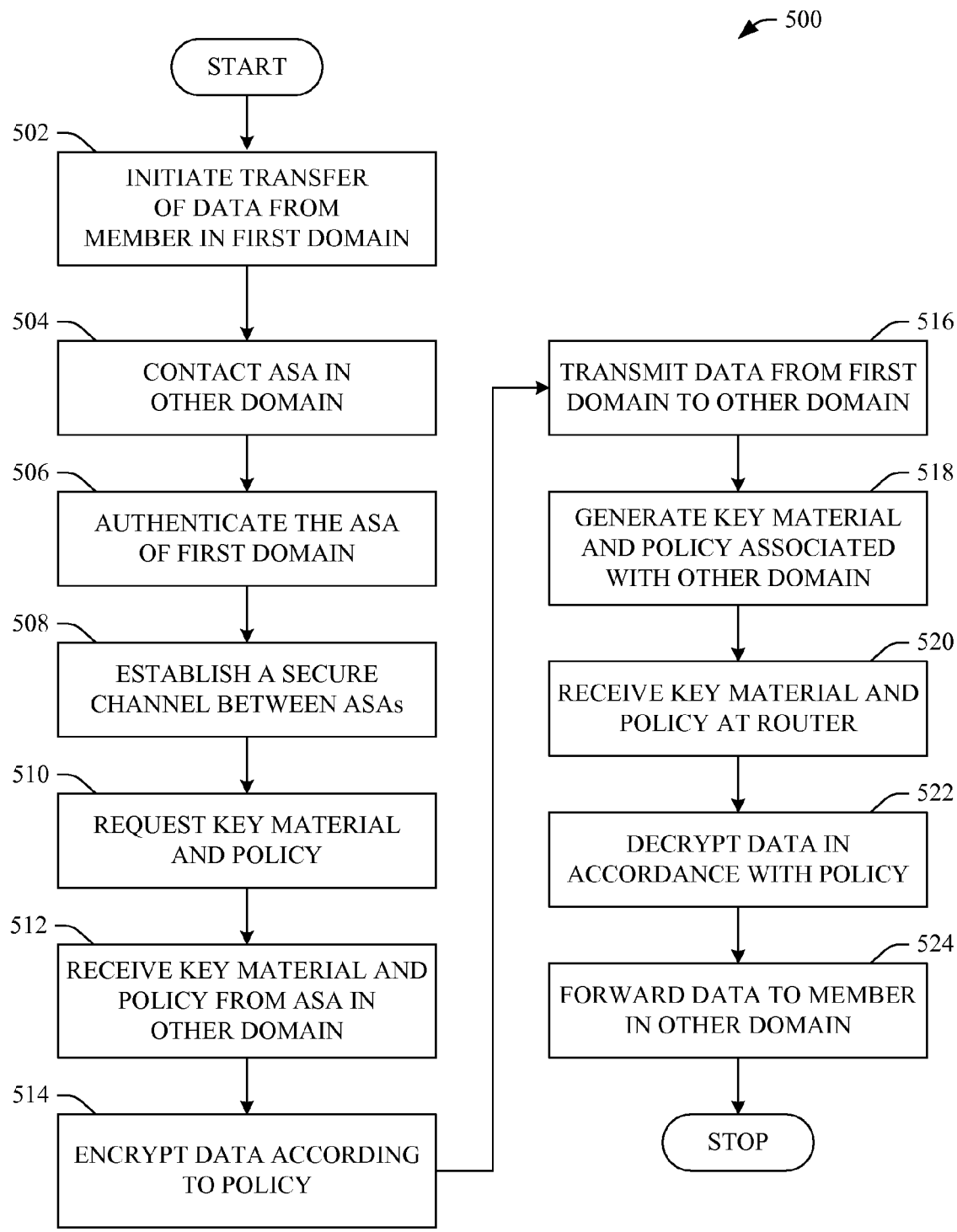
FIG. 5 illustrates a flow chart of an example methodology that facilitates secure communication of data between domains in accordance with an embodiment.

FIGS. 4-5 illustrate methodologies in accordance with the subject disclosure. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 illustrates an example methodology 400 of transferring keying materials and crypto-policy information in accordance with an embodiment. At 402, an ASA (e.g., ASAa 108) located in one VPN (e.g., DGVPN) in one domain can contact a disparate ASA located in a disparate VPN (e.g., disparate DGVPN) in a disparate domain. At 404, authentication of the ASA of the first domain can be performed. For example, the disparate ASA can require that the ASA provide appropriate credentials identifying the ASA and demonstrating that the ASA has the authority to access information from the disparate ASA. At 406, a determination can be made as to whether the ASA is authenticated. If the ASA is not authenticated, then, at 408, the ASA is denied access to information from the disparate ASA. If, at 406, the ASA is authenticated, for example, where the provider associated with the ASA is a cooperating provider with the provider associated with the disparate ASA and proper credentials are presented, then at 410, a secure channel is established between the ASA of the first domain and the disparate ASA. At 412, the ASA can request keying materials and crypto-policy information associated with the disparate VPN. At 414, the disparate ASA can generate the key materials and crypto-policy information associated with its local VPN. At 416, such keying materials and crypto-policy information can be sent to the ASA of the first domain. At this point, the methodology ends.

For example, such materials and information can be utilized by the ASA and PE of the first domain to encrypt data in accordance with the policy of the disparate VPN, so that the encrypted data can be securely transmitted from the VPN in the first domain to the disparate VPN in the disparate domain, where it can be decrypted in accordance with the policy associated with the disparate VPN.

FIG. 5 illustrates a methodology 500 for secure communication of data in accordance with an embodiment. At 502, a member (e.g., group member) can initiate a transfer of data from the member, which resides in a network (e.g., DGVPN) in a first domain, to another member (e.g., group member) in another network (e.g., another DGVPN) in a different domain. At 504, an ASA in the first domain can contact another ASA located the different domain. At 506, the other ASA can authenticate the ASA of the first domain. At 508, a secure channel can be established with the other ASA between the two domains. At 510, the ASA of the first domain can request keying materials and crypto-policy information associated with the other network and other ASA. At 512, the ASA can receive the keying materials, or a subset thereof, and the crypto-policy information, or a subset thereof, from the other ASA. Such keying materials and crypto-policy information can the same as that used within the other network, or they may be distinct, while still enabling the ASA to honor the policy of the other network. At 514, the keying materials and crypto-policy information can be used to encrypt the data being sent in accordance with the policy of the other network. At 516, the encrypted data can be sent from the network in the first domain to the network in the other domain. At 518, the ASA in the other domain can generate keying materials and crypto-policy information to facilitate the decryption of the encrypted data. At 520, a component (e.g., PE) in the other network can receive the keying materials and crypto-policy information. At 522, the encrypted data can be decrypted in accordance with the policy of the other network using such materials and information. At 524, the decrypted data can be forwarded or presented to the other member associated with the other domain. At this point the methodology ends.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the subject disclosure have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 6:
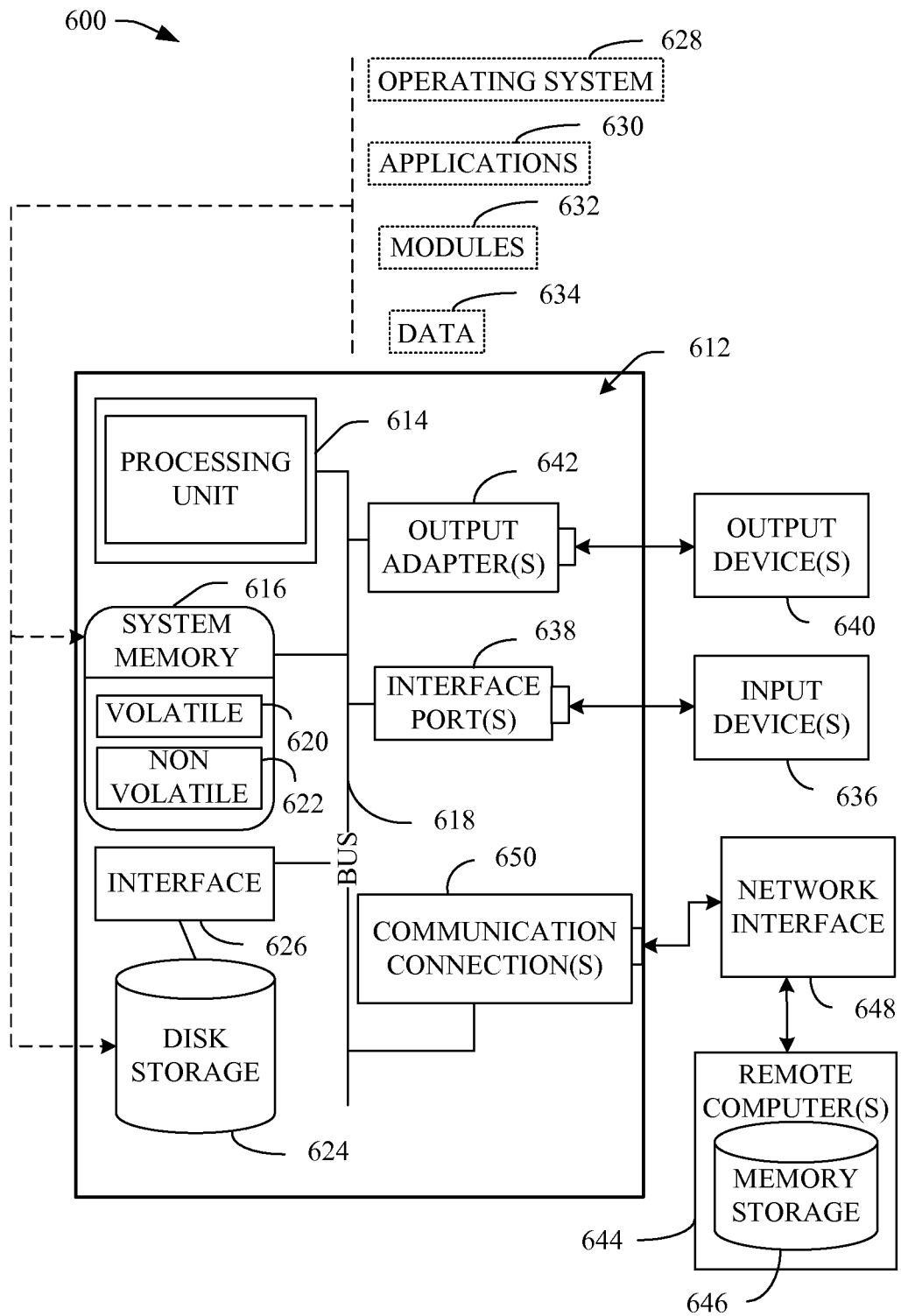
FIG. 6 is a schematic block diagram that illustrates an example of a suitable operating environment.
Figure 7:
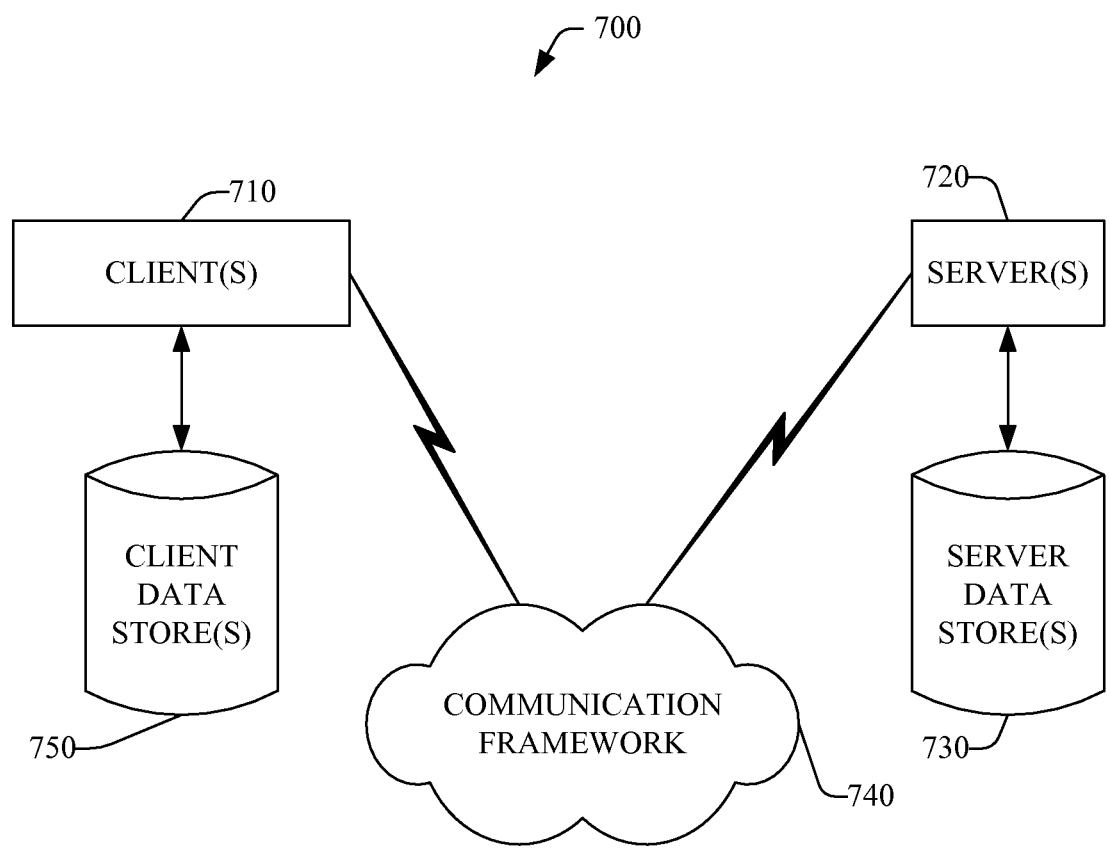
FIG. 7 is a schematic block diagram that illustrates an example of a sample-computing environment.

In order to provide a context for the various aspects of the disclosed subject matter, FIGS. 6 and 7 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., PDA, phone, watch), microprocessor-based or programmable consumer and/or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 6, a suitable environment 600 for implementing various aspects of the claimed subject matter includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include ROM, PROM, electrically programmable ROM (EPROM), electrically erasable programmable ROM (EEPROM), or flash memory. Volatile memory 620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 612 also includes removable/non-removable, volatile/non-volatile computer storage media. FIG. 6 illustrates, for example, a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used, such as interface 626.

It is to be appreciated that FIG. 6 describes software that acts as an intermediary between users and the basic computer resources described in the suitable operating environment 600. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the disclosed subject matter can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640, which require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

FIG. 7 is a schematic block diagram of a sample-computing environment 700 with which the subject disclosure can interact. The system 700 includes one or more client(s) 710. The client(s) 710 can be hardware and/or software (e.g., threads, processes, computing devices). The system 700 also includes one or more server(s) 720. Thus, system 700 can correspond to a two-tier client server model or a multi-tier model (e.g., client, middle tier server, data server), amongst other models. The server(s) 720 can also be hardware and/or software (e.g., threads, processes, computing devices). The servers 720 can house threads to perform transformations by employing the subject innovation, for example. One possible communication between a client 710 and a server 720 may be in the form of a data packet transmitted between two or more computer processes.

The system 700 includes a communication framework 740 that can be employed to facilitate communications between the client(s) 710 and the server(s) 720. The client(s) 710 are operatively connected to one or more client data store(s) 750 that can be employed to store information local to the client(s) 710. Similarly, the server(s) 720 are operatively connected to one or more server data store(s) 730 that can be employed to store information local to the servers 720.

What has been described above includes examples of aspects of the subject disclosure. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates secure communication of data between disparate autonomous systems (AS), the system comprising:

a server including a processing unit coupled to a system memory, the server also including:

a security component associated with a dynamic group virtual private network conforming to a first security policy in a first domain, the first domain defined by a first range of IP addresses, wherein the security component, requests, from a disparate server, keying material and crypto-policy information associated with a disparate dynamic group virtual private network, the disparate dynamic group virtual private network conforming to a second security policy in a disparate domain, the disparate domain defined by a second range of IP addresses, the first security policy being different than the second security policy, receives, from the disparate server in the disparate dynamic group virtual private network, the keying material and the crypto-policy information associated with the disparate dynamic group virtual private network and conforming to the second security policy, and encrypting data using the keying material and the crypto-policy information and sending the encrypted data from a first client in the dynamic group virtual private network to a second client within the disparate dynamic group virtual private network in accordance with the second security policy and; and a routing component that transmits the encrypted data from the dynamic group virtual private network in the first domain to the disparate server in the disparate dynamic group virtual private network in the disparate domain, wherein the disparate server forwards data decrypted from the encrypted data to the second client in the disparate domain, the routing component being associated with the security component and a plurality of prefixes, each prefix of the plurality of prefixes being part of the routing protocol between the first domain and the disparate domain.

2. The system of claim 1, wherein the security component is a key server.

3. The system of claim 1, further comprising a disparate routing component that is associated with the disparate dynamic group virtual private network that receives the encrypted data, and a disparate security component associated with the disparate dynamic group virtual private network that decrypts the encrypted data according to the crypto-policy information associated with the disparate dynamic group virtual private network.

4. The system of claim 1, wherein the security component is authenticated prior to obtaining a subset of the keying material and a subset of the crypto-policy information, the security component is authenticated by a disparate security component associated with the disparate dynamic group virtual private network.

5. The system of claim 1, wherein the security component generates a subset of the keying material and a subset of the crypto-policy information associated with the dynamic group virtual private network and transmits such material and information to a disparate security component associated with the disparate dynamic group virtual private network.

6. The system of claim 1, further comprising:
an interface component that can employ a virtual private network routing/forwarding instance global-interface outbound crypto-map mapping such that crypto-policy information is applied to data packets outside the first domain.

7. The system of claim 1, wherein a subset of the crypto-policy information is associated with a crypto-policy that comprises a list of prefixes to which the crypto-policy is applied.

8. The system of claim 1, wherein a subset of the crypto-policy information is associated with a crypto-policy, the crypto-policy is associated with prefixes that serve as multicast sources such that at least one receiver in the disparate domain obtains key material associated with and for inter-domain multicast trees.

9. The system of claim 1, wherein the security component secures data in accordance with a crypto-policy associated with at least one of the dynamic group virtual private network associated with the first domain or the disparate dynamic group virtual private network associated with the disparate domain.

10. A method that facilitates communication of data between disparate autonomous systems (AS), the method comprising:
sending a request for keying material and crypto-policy information conforming to a second security policy from a first server in a first dynamic group virtual private network to a second server in a second dynamic group virtual private network, wherein the first dynamic group virtual private network is within a first range of IP addresses and conforms to a first security policy, and the second dynamic group virtual private network is within a second range of IP addresses and conforms to the second security policy, the first security policy being different than the second security policy;
receiving from the second server in the second dynamic group virtual private network, at the first server within the first dynamic group virtual private network, the keying material and crypto-policy information conforming to the second security policy from the second dynamic group virtual private network, the keying material and the crypto-policy information are associated with the second dynamic group virtual private network, the crypto-policy information being associated with a plurality of prefixes, each prefix of the plurality of prefixes being part of a routing protocol between the first dynamic group virtual private network and the second dynamic group virtual private network;
encrypting data packets, received from a first client, in accordance with the crypto-policy information and using the keying material, the data packets are encrypted on the first server in the first dynamic group virtual private network; and
transmitting the encrypted data packets from the first server in the first dynamic group virtual private network to the second server in the second dynamic group virtual private network, wherein the second server forwards data decrypted from the encrypted data to a second client in the second dynamic group virtual private network.

11. The method of claim 10, further comprising:
generating the keying material and the crypto-policy information; and
propagating the keying material and crypto-policy information to the first server.

12. The method of claim 11, further comprising:
decrypting the data packets after the data packets are received in the second dynamic group virtual private network, the data packets are decrypted in the second dynamic group virtual private network; and
transferring the decrypted data packets to the second client associated with the second dynamic group virtual private network.

13. The method of claim 12, further comprising:
routing the data packets to the prefixes in the second dynamic group virtual private network.

14. The method of claim 10, further comprising:
contacting a disparate security component within the second server in the second dynamic group virtual private network;
authenticating communication between a security component on the first server within the first dynamic group virtual private network and the disparate security component;
establishing a secure channel between the security component and the disparate security component to facilitate the transfer of the keying material and the crypto-policy information;
requesting the keying material and the crypto-policy information;
generating the keying material and the crypto-policy information on the disparate security component; and
sending the keying material and the crypto-policy information to the security component via the secure channel.

15. The method of claim 10, further comprising:
generating a list of prefixes associated with the crypto-policy information; and
sending the list of prefixes with the crypto-policy information.

16. The method of claim 10, further comprising:
tagging the plurality of prefixes during router distribution.

17. A non-transitory computer-readable storage medium containing instructions, which when executed by a processor cause the processor to:
send a request for keying material and crypto-policy information conforming to a second security policy from a first server in a first dynamic group virtual private network to a second server in a second dynamic group virtual private network, wherein the first dynamic group virtual private network is within a first service provider network and conforms to a first security policy, and the second dynamic group virtual private network is within a second service provider network and conforms to the second security policy, the first security policy being different than the second security policy;

receive from the second server in the second dynamic group virtual private network, on the first server within the first dynamic group virtual private network, the keying material and crypto-policy information conforming to the second security policy from the second dynamic group virtual private network, the keying material and the crypto-policy information allowing secure access to the second dynamic group virtual private network, the crypto-policy information being associated with a plurality of prefixes, each prefix of the plurality of prefixes being part of a routing protocol between the first dynamic group virtual private network and the second dynamic group virtual private network;

encrypt data packets, received from a first client, in accordance with the crypto-policy information on the first server within the first dynamic group virtual private network and using the keying material; and transmit the encrypted data packets from the first server in the first dynamic group virtual private network to the second server in the second dynamic group virtual private network, wherein the second server forwards data decrypted from the encrypted data to a second client in the second dynamic group virtual private network.

18. A method that facilitates secure communication between disparate service provider networks, the method comprising:

receiving a request for keying material and crypto-policy information conforming to a first security policy from a second server located within a second dynamic group virtual private network operating within a second service provider network by a first server within a first dynamic group virtual private network operating within a first service provider network for secure communication between a first client within the first dynamic group virtual private, the first dynamic group virtual private associated with a first range of IP addresses and conforming to a first security policy, and a second client within the second dynamic group virtual private, the second dynamic group virtual private associated with a second range of IP addresses and conforming to a second security policy, the request originating from within the second dynamic group virtual private, the first security policy being different than the second security policy;

sending to the second server, based on the received request, key material and crypto-policy information conforming to the first security policy over a secure communication channel;

receiving, on the first server, encrypted data packets addressed to the first client from the second client within the first dynamic group virtual private, the data packets secured according to the crypto-policy information and using the key material shared with the second dynamic group virtual private by the first dynamic group virtual private;

decrypting, on the first server, the encrypted data packets using the key material and the crypto-policy information, the crypto-policy information being associated with a plurality of prefixes, each prefix of the plurality of prefixes being part of the routing protocol between the first dynamic group virtual private and the second dynamic group virtual private; and delivering, from the first server, the decrypted data packets to the first client.

* * * * *